Oct. 25, 1949.  E. L. GINZTON  2,485,584
DISTANCE MEASURING APPARATUS
Original Filed March 15, 1943
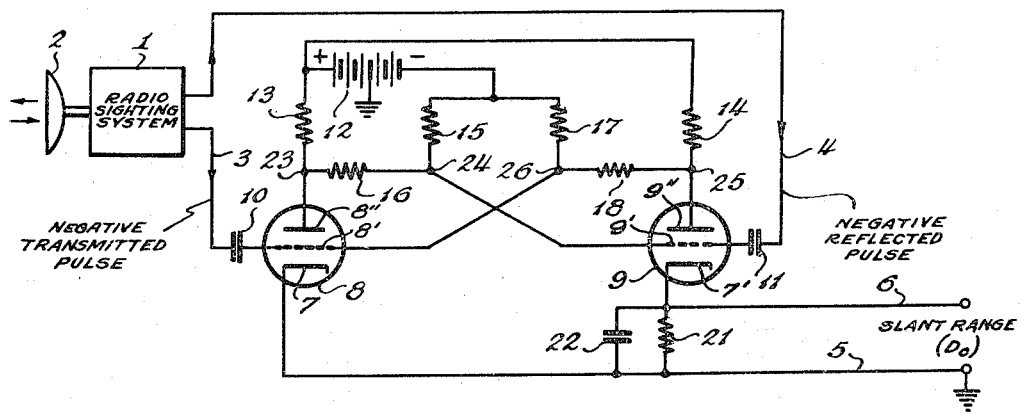
INVENTOR
EDWARD L. GINZTON
BY Paul B. Hunter
ATTORNEY Patented Oct. 25, 1949

2,485,584

UNITED STATES PATENT OFFICE 2,485,584

DISTANCE MEASURING APPARATUS

Edward L. Ginzton, Garden City, N. Y., assignor to The Sperry Corporation, a corporation of Delaware Original application March 15, 1943, Serial No. 479,294. Divided and this application November 11, 1943, Serial No. 509,867

3 Claims. (Cl. 343—13)

This invention relates generally to the reflected-pulse type of radio systems, and the invention has reference more particularly to a novel distance-measuring system wherein pulses of electromagnetic energy are directed at a distant object and corresponding reflected portions of this energy are received back at the system, novel means being provided for determining the distance of the object.

This application is a division of copending application Serial No. 479,294, filed March 15, 1943, in the names of William W. Hansen and Edward L. Ginzton.

An object of the present invention is to provide electronic means for and a method of obtaining as an electrical voltage signal a measure of the range or distance to an object in a reflected-pulse type of object-detecting system.

Another object of the invention is to provide a distance-measuring, reflected-pulse type radio system employing an electronic circuit for receiving information as to the time of transmission of a pulse and the time of receipt of the corresponding reflected pulse, the said circuit operating from such information to compute and provide an output that is a direct voltage proportional to this lapse of time, and therefore proportional to the range or distance of the object.

Still another object of the present invention is to provide a novel distance-measuring system employing a pair of electron tubes so interconnected that one of said tubes only conducts during the interval of time between the transmitted and reflected pulses, thereby serving as a measure of the distance, the other of the said tubes being conductive when the first-mentioned tube is non-conducting.

Still another object of the present invention is to provide a novel distance-measuring system wherein electronic means is provided for initiating flow of constant current in response to a transmitted pulse, additional electronic means being provided for terminating the current in response to a received pulse, together with means for determining a quantity proportional to the average value of such current.

Other objects, features, and advantages will become apparent from the specification, taken in connection with the accompanying drawings wherein one embodiment of the invention is illustrated.

In the drawing, the figure is a wiring diagram of the electronic range measuring circuit of the present invention as employed in a reflected pulse type object detecting system.

Referring now to the figure, a radio sighting system 1 is provided which is preferably of the reflected pulse type, as disclosed in copending application Serial No. 441,188, for "Radio gun control system," filed April 30, 1942, in the names of C. G. Holschuh et al. As described in that application, periodic pulses of electromagnetic energy are radiated in a conical fashion about a distant object from a suitable reflector schematically indicated at 2. The reflector 2 is also employed to receive back corresponding pulses reflected from an object lying within the irradiated conical portion of space. The phase and magnitude of the variation in intensity of the reflecting pulse may then be interpreted by suitable detecting circuits which produce output signal voltages proportional to the angular deviation in elevation and azimuth of the axis of the cone of space irradiated (the spin axis of reflector 2) with respect to the line of sight to the object.

These voltage signals may then be introduced into suitable servo mechanisms which operate to drive the spin axis of the reflector 2 in such a direction as to reduce the signal voltages to zero. In this manner, the spin axis is continuously maintained coincident with the line of sight to the object, thus providing a measure of the angular position of the target in elevation and azimuth. Azimuth and elevation output shafts (not shown) may be connected to the spin axis by suitable gearing so that the angular displacement of these shafts is then proportional to the present azimuth and elevation of the object.

As is well known, the lapse of time between a transmitted pulse and a corresponding received pulse is proportional to the distance to the object. The electronic circuit of Fig. 1 receives, as on leads 3 and 4, respectively, information as to the time of transmission of a pulse and the time of receipt of the corresponding reflected pulse, and from this information operates to compute and provide across its output leads 5 and 6, a direct voltage proportional to this lapse of time, and, therefore, proportional to the slant range ($D_0$) to the object.

As shown, this electronic range measuring circuit essentially comprises two vacuum tubes 8 and 9 illustrated as triodes. The grid 8' of tube 8 is fed through the condenser 10 by the negative transmitted pulse received on lead 3. The grid 9' of tube 9 is fed through the condenser 11 by the negative reflected pulse received on lead 4. Should the transmitted and reflected pulses appear in the radio sighting system only as positive pulses, it is a simple matter to provide reversing circuits adapted to produce the required corresponding negative pulses.

The plate supply voltage for both tubes, indicated as the battery 12, is shown grounded at a point intermediate to its positive and negative terminals. The positive side of the battery is connected to the plate 8" of tube 8 through the resistor 13 and to the plate 9" of tube 9 through the resistor 14. The negative side of the battery is also connected to the plate of tube 8 through the resistors 15 and 16 and to the plate of tube 9 through the resistors 17 and 18. The grid of tube 8 is connected to a point intermediate the resistors 17 and 18, while the grid of tube 9 is connected to a point intermediate the resistors 15 and 16. Tube 8 has its cathode 7 connected to the grounded output conductor 5. The cathode 7' of tube 9 is connected to the ungrounded output conductor 6 and then to ground through the resistor 21. An integrating condenser 22 is connected in parallel with the resistor 21, as shown.

It is apparent that the electron circuit for tube 8 is from ground, through the tube, through resistor 13, to the positive side of the battery 12 and back to ground. The circuit for tube 9 is from ground, through the parellel circuit consisting of the resistor 21 and the condenser 22, through the tube, through the resistor 14, to the positive side of the battery 12 and then to ground. Also, the battery 12 and resistors 15, 16 and 13 constitute a closed circuit, and the battery 12 and resistors 17, 18 and 14 constitute a similar closed circuit.

The theory of operation of the circuit is that because of the control influence exerted by the negative transmitted and reflected pulses applied to the grids of the two tubes, tube 9 only conducts during the interval of time between the transmitted and reflected pulses. The condenser 22 functions to integrate or smooth out this tube current flowing through resistor 21, thus providing a voltage across output conductors 5 and 6 which is proportional to the time interval during which tube 9 is conducting, and therefore, proportional to the slant range ($D_0$).

The circuit may be considered as having two conditions of stable operation, in the first of which tube 8 is conducting, and tube 9 is non-conducting, and in the second of which tube 9 is conducting and tube 8 is non-conducting. Transfer from the first to the second of these conditions of equilibrium is effected by the receipt of a negative transmitted pulse on the grid of tube 8, and retransfer is effected by the receipt of a negative reflected pulse on the grid of tube 9. In order to explain the operation, it will first be assumed that tube 8 is conducting and tube 9 non-conducting. The resulting current flow through resistor 13 lowers the potential of the point 23 to such an extent that the grid of tube 9 is maintained below cut-off, blocking current flow through tube 9. A negative transmitted pulse impressed upon the grid of tube 8 momentarily biases this tube beyond cut-off blocking current flow through tube 8. The resulting decrease of current through resistor 13 raises the potential of points 23 and 24, and therefore, of the grid of tube 9 to such a value that tube 9 begins to conduct.

With tube 9 conducting, the additional flow of plate current through resistor 14 causes a lowering of the potential of points 25 and 26, and the grid of tube 8 is, therefore, maintained at a potential below cut-off. Accordingly, when the negative transmitted pulse has passed, tube 8 is prevented from conducting again and the circuit is operating under its second condition of equilibrium wherein tube 9 alone conducts. Tube 9 will continue to conduct until a negative reflected pulse is impressed upon its grid at which time current flow will be transferred to tube 8 in a manner exactly similar to the above described transfer of current flow to tube 9.

It will be obvious, therefore, that tube 9 will be conducting only for the time elapsing between the receipt of a transmitted pulse on the grid of tube 8 and the receipt of a reflected pulse on the grid of tube 9. As previously stated, the parallel circuit consisting of resistor 21 and condenser 22 serves to measure the total current flow through tube 9 and to provide a voltage across the output conductors 5 and 6 which is proportional to this total current flow, and therefore, also proportional to slant range ($D_0$).

Although direct current voltage signals have been employed throughout for the purpose of illustration, it will be apparent that many of the principles embodied in the present invention could obviously be employed to operate in a similar manner on alternate current voltage signals. It is therefore to be understood the present invention is not intended to be limited to the use of direct current voltage signals only.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a reflected pulse type radio system, wherein periodic pulses of electromagnetic energy are directed at a distant object and the corresponding reflected portions of said energy pulses are received back at the system, means for determining the distance to said object, comprising an electronic circuit arrangement adapted to receive said transmitted and said received pulses, said circuit arrangement comprising a pair of electron tubes having their anodes and grids respectively interconnected, fixed bias means for the grids of said tubes connected independently of the grid-plate interconnection, said circuit arrangement having two modes of stable operation respectively initiated by said pulses, and means for producing a voltage proportional to the duration of that mode initiated by said transmitted pulses.

2. In a reflected pulse type radio system, wherein periodic pulses of electromagnetic energy are directed at a distant object and the corresponding reflected portions of said energy pulses are received back at the system, means for determining the distance to said object, comprising an electronic circuit arrangement including two electron tubes and associated circuit elements, said circuit arrangement having feedback means producing two modes of stable operation in the first of which only the first of said tubes is conducting and in the second of which only the second of said tubes is conducting, means for applying a fixed normal bias on the grids of said tubes independently of said feedback means, means for impressing negative transmitted pulses upon the grid of the second of said tubes to initiate the first of said modes, means for impressing negative received pulses upon the first of said tubes to initiate the second of said modes, a parallel resistor-capacitor circuit in series with the cathode of said first tube, and means for extracting the voltage across said parallel circuit.

3. In a reflected pulse type radio system, wherein periodic pulses of electromagnetic energy are directed at a distant object and the corresponding reflected portions of said energy pulses are received back at the system, means for determining the distance to said object, comprising an electron tube, means for supplying a fixed bias for the control electrode of said tube, means comprising a connection independent of said fixed bias means for initiating current flow through said tube upon the receipt of a negative transmitted pulse, means for terminating said current flow upon the receipt of a negative received pulse, a resistor-capacitor parallel circuit arrangement in series with said tube, and means for extracting the voltage built up across said circuit arrangement.

EDWARD L. GINZTON.

REFERENCES CITED

The following references are of record in the file of this patent:

UNITED STATES PATENTS

| Number | Name | Date |
|---|---|---|
| 2,055,883 | Terry | Sept. 29, 1936 |
| 2,189,549 | Hershberger | Feb. 6, 1940 |
| 2,244,369 | Martin | June 3, 1941 |
| 2,266,509 | Percival et al. | Dec. 16, 1941 |
| 2,301,195 | Bradford | Nov. 10, 1942 |
| 2,324,797 | Norton | July 20, 1943 |
| 2,337,328 | Hathaway | Dec. 21, 1943 |
| 2,416,333 | Lehmann | Feb. 25, 1947 |
| 2,421,018 | De Rosa | May 27, 1947 |
| 2,426,454 | Johnson | Aug. 26, 1947 |

FOREIGN PATENTS

| Number | Country | Date |
|---|---|---|
| 497,147 | Great Britain | Dec. 9, 1938 |
| 469,417 | Great Britain | July 26, 1937 |

OTHER REFERENCES

"Review of Scientific Instruments," December 1937, vol. 8, pages 502-504.

"Electronics," January 1942, pages 34, 35.